(12) United States Patent
Srinivasan et al.

(10) Patent No.: US 11,533,519 B2
(45) Date of Patent: *Dec. 20, 2022

(54) SYSTEMS AND METHODS FOR MODIFYING DATE-RELATED REFERENCES OF A MEDIA ASSET TO REFLECT ABSOLUTE DATES

(71) Applicant: Rovi Guides, Inc., San Jose, CA (US)

(72) Inventors: Madhusudhan Srinivasan, Bangalore (IN); Durga Prasad Pulicharla, Pradesh (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/190,257

(22) Filed: Mar. 2, 2021

(65) Prior Publication Data

US 2021/0266614 A1    Aug. 26, 2021

Related U.S. Application Data

(63) Continuation of application No. 16/145,551, filed on Sep. 28, 2018, now Pat. No. 10,972,762.

(51) Int. Cl.
| | |
|---|---|
| *H04N 7/10* | (2006.01) |
| *H04N 7/025* | (2006.01) |
| *H04N 21/234* | (2011.01) |
| *H04N 21/233* | (2011.01) |
| *H04N 21/2343* | (2011.01) |
| *H04N 21/858* | (2011.01) |
| *H04N 21/81* | (2011.01) |
| *H04N 21/84* | (2011.01) |
| *H04N 21/235* | (2011.01) |

(52) U.S. Cl.
CPC ..... *H04N 21/23418* (2013.01); *H04N 21/233* (2013.01); *H04N 21/2353* (2013.01); *H04N 21/234345* (2013.01); *H04N 21/8133* (2013.01); *H04N 21/84* (2013.01); *H04N 21/858* (2013.01)

(58) Field of Classification Search
CPC .......... H04N 21/23418; H04N 21/233; H04N 21/234345; H04N 21/2353; H04N 21/8133; H04N 21/84; H04N 21/858
See application file for complete search history.

(56) References Cited

U.S. PATENT DOCUMENTS

| | | | |
|---|---|---|---|
| 6,816,858 B1 * | 11/2004 | Coden .................. | G06F 16/748 707/999.005 |
| 3,051,088 A1 | 11/2011 | Tibbei et al. | |
| 8,051,088 B1 * | 11/2011 | Tibbetts ................. | G06F 40/30 704/7 |
| 2013/0114864 A1 * | 5/2013 | Garcia ................... | G06V 20/30 382/118 |
| 2014/0157296 A1 * | 6/2014 | Amidei ............. | H04N 21/4788 725/13 |
| 2017/0199872 A1 * | 7/2017 | Krasadakis ............ | G06F 16/43 |

* cited by examiner

*Primary Examiner* — Mulugeta Mengesha
(74) *Attorney, Agent, or Firm* — Haley Guiliano LLP

(57) ABSTRACT

A media asset may include date-related information. When viewed out of context it may be unclear what date is referenced by the date-related information. The media asset may be parsed to identify the date-related information within the media asset. The media asset may be analyzed to determine the context for the date related information. An absolute date may be determined based on this context and the date-related information and provided to the user with the media asset.

20 Claims, 8 Drawing Sheets

SYSTEMS AND METHODS FOR MODIFYING DATE-RELATED REFERENCES OF A MEDIA ASSET TO REFLECT ABSOLUTE DATES

CROSS-REFERENCE TO RELATED APPLICATION(S)

This application is a continuation of U.S. patent application Ser. No. 16/145,551, filed on Sep. 28, 2018. The disclosures of each application are hereby incorporated by reference herein in their entireties.

BACKGROUND

The present disclosure is directed to systems for providing media assets to a user, and more particularly, to systems that modify date-related references within media assets.

SUMMARY

Media assets such as video assets often include written or spoken references to a date. These date-related references are typically embedded within a larger portion of text, audio, or video, and may often be ambiguous standing alone, or even within the particular portion of the media asset. A user accessing the media asset may have difficulty understanding the date-related reference, particularly if the date related reference is being accessed in a manner that limits the availability of contextual information, e.g., if a user is located in a different locale, far away time zones, or is accessing the media asset on-demand at a later time. For example, media content may be produced at or may describe a particular time, location, or event. The media content may refer to relative or ambiguous measures of time, such as a day of the week (e.g., "Wednesday") or other similar descriptions (e.g., "yesterday," "this morning," "rush hour," "the starting bell," "next week," etc.). However, a user viewing the media content may have difficulty understanding such relative or ambiguous measures of time, particularly if the user is located multiple time zones away from a location for the media content, or if the user is viewing a recording of the media content. This problem is exacerbated as more content is available worldwide, from multiple different sources, and on-demand without regard to the time or location of the original production or broadcast of the media content.

In an embodiment of the present disclosure, the media asset may be processed to determine an absolute date for presentation to a user, improving the display of the media asset, the user's comprehension of the media asset, and the precision and quality of the data structures that are associated with media asset. For example, the media asset may be processed at one or more of a number of computing devices and servers between the creation and acquisition of the media asset and the presentation of the media asset to an end user. The media asset may be parsed to identify date-related references in the media asset, such as from closed-caption text, audio, or images displayed in the media asset. Date-related references may be associated with the portions of the media asset that include the date-related references for additional processing.

The media asset may then be processed to identify a context for the date-related reference. In embodiments, some or all of the date-related references, the portions of media asset associated with those date related references, and metadata associated with the date-related reference may be processed to identify the context. Patterns related to context may be determined, such as relative times and dates, occurrence of particular events, identification of individuals and organizations, and other similar information. In some embodiments, the information from the media asset may be processed with other data sources, such as knowledge databases, search engines, information for a particular end user, and information related to entities that created or distributed the media asset. Data may be aggregated over large data sets, such that machine learning algorithms may be applied to a particular media asset to identify context based on patterns identified from other media assets.

The absolute date for the date-related reference may be determined from the context of the portion of the media asset. In an embodiment, this determination may be based on comparing the date-related reference to a number of possible events or to a reference date for the media asset. The media asset may be compared to known events, or the reference date may be a date of recording, a date of broadcast, or a past date that is depicted in the media asset. The date-related reference may be used to select between a number of possible absolute dates. The content of the media asset in the portion of the media asset that includes the date related reference may be compared to other content (e.g., related to different possible events) to determine the absolute date for the date-related reference.

The display of the media asset may be updated or augmented based on the absolute date that is identified for the date-related reference. The media asset may be modified such that the underlying date-related reference (e.g., audio, text, images, or closed-caption text) is replaced with the absolute date. This replacement may be performed transparently to the end user such by matching characteristics of absolute date of the replacement media (e.g., font, voice, background image, volume, etc.) to the original media that included the date-related reference. In some embodiments, the media including the absolute date may be identified as replacing or augmenting an original date-related reference. Supplemental content relating to the absolute date such as an event referenced by the date-related referenced may be provided with the media asset. The user may access the supplemental content through a user interface. In some embodiments, multiple possible absolute dates and events may be provided as supplemental content to the media asset. User selections of particular absolute dates and events may be utilized as training data for the system.

It should also be noted that the systems and/or methods described above may be applied to, or used in accordance with, other systems and/or methods.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems in accordance with the present disclosure identify a date-related reference in a media asset and determine an absolute date for inclusion with the media asset. The media asset may be parsed to identify date-related references within the media asset that are associated with a date but are unclear as to an absolute date. Date related references include relative terms such as "this morning," "yesterday," "next week," "Wednesday," and other similar terminology that is referring to a particular absolute date by reference to another date such as when the media asset was recorded or distributed. Ambiguous terms such as "the next game of the Western Conference Finals" or "the most recent election" may reference an event that is associated with a date without clearly identifying the date or the exact event.

The date-related references of the media asset are processed to identify an absolute date that corresponds to the date-related reference. The date-related reference is associated with a portion of a media asset and the context for that portion of the media asset is determined, for example, based on the content of the portion of the media asset, metadata of the media asset, analysis of similar media assets, or user selections (e.g., aggregated user selections used as training data to identify context patterns within media assets). The date-related reference is then processed with the context of the portion of the media asset to determine the absolute date for the date-related reference. The absolute date is presented with the media asset by replacing or augmenting the date-related reference with the absolute date or other related content.

Figure 1:
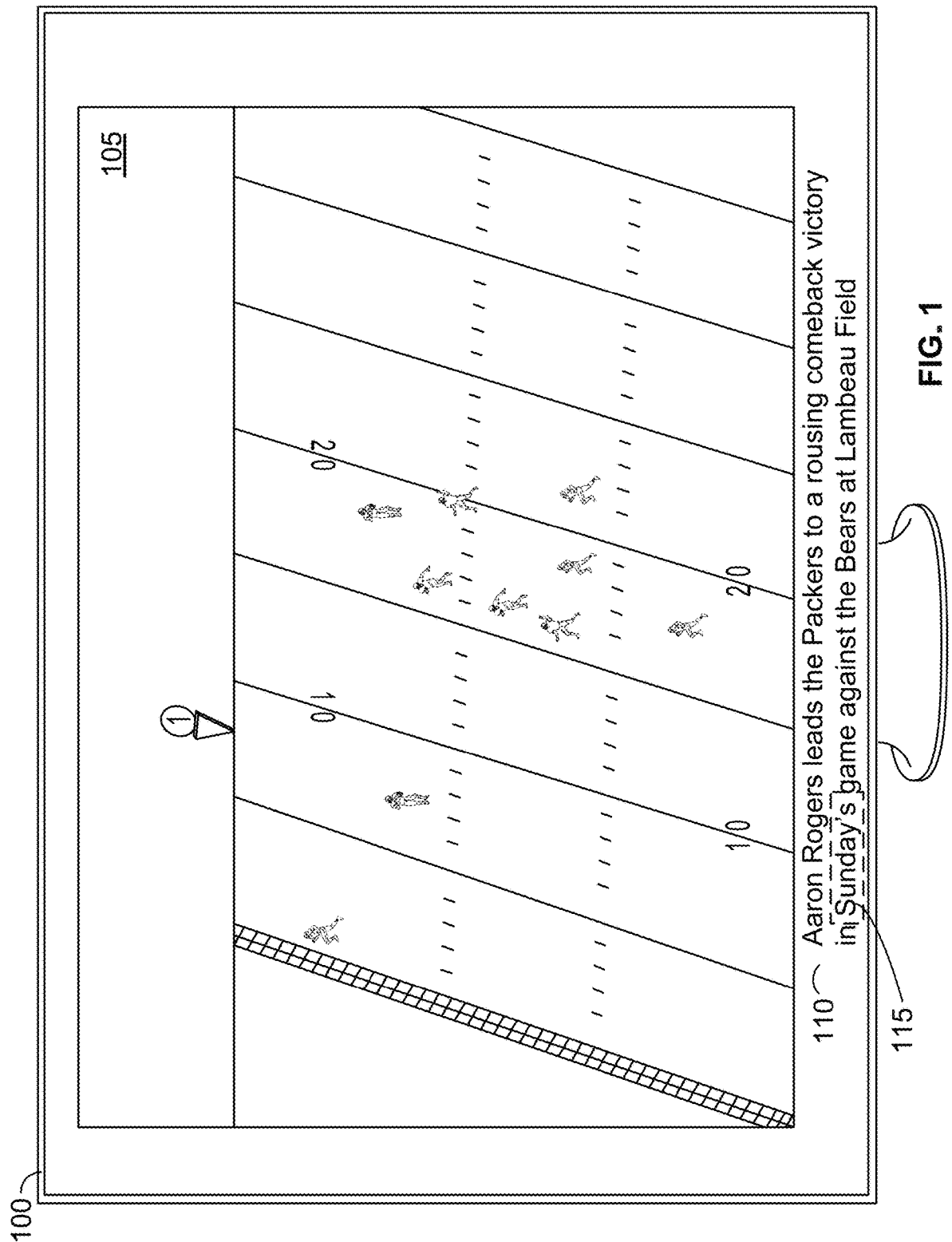
FIG. 1 shows an illustrative embodiment of a user interface depiction of a media asset including a date-related reference, in accordance with some embodiments of the disclosure.

FIG. 1 shows an illustrative embodiment of a user interface depiction of a media asset including a date-related reference, in accordance with some embodiments of the disclosure. Although FIG. 1 depicts an exemplary user interface 100 such as a television screen 100, it will be understood that the user interface of the present disclosure may include other suitable user interfaces for rendering user content such as computer monitors, displays of smart phones or tablets, projection interfaces, and virtual or augmented reality devices.

The exemplary user interface 100 displays a media asset 105 to a user. The media asset 105 may be accessed from one or more of a variety of sources such as over-the-air signals, cable network signals, and wired or wireless streaming sources. The media asset 105 may be broadcasted, recorded, and produced from a particular location and at a particular time, and may depict real or fictional events. While the exemplary media asset 105 of FIG. 1 may depict an exemplary discussion of a recently-played football game, other media assets may depict or reference live or historical events, and may do so through a variety of different mediums or formats. Information relating to the media asset may be stored in metadata that is associated with the asset or may be available from the media asset itself. Exemplary metadata may include information about the creation, content, and distribution of the media asset, including date and time information, individuals and entities involved in or referenced in the media asset, categories and descriptions of subject matter, related subject matter and media assets, text or symbolic representations of audio and depicted text, and other information related to the media assets. Metadata may be associated with particular portions of the media asset based on media asset information such as time stamps, scenes, events, commercial content, or other similar information that delineates a portion of the media asset from other portions of the media asset.

The media asset 105 may include content 110, such as the text "Aaron Rogers leads the Packers to a rousing comeback victory in Sunday's game against the Bears at Lambeau Field" of FIG. 1. In the exemplary embodiment of FIG. 1, the text content may be provided as part of the underlying media asset, such as text overlaid upon a highlight from Sunday's football game between the Packers and Bears. It will be understood that the content 110 may be provided in multiple formats, such as audio provided with the media asset, closed captioning available to for the underlying audio, or text depicted within images of the media asset.

The content may include a date-related reference as described herein, such as the word "Sunday" 115 in content 110. The date-related reference 115 may be problematic for certain users depending on where, when, and how they access the media asset 105. Advancements in the distribution and storage of media content facilitate worldwide access to media assets in multiple formats, including on-demand access from a variety of sources. The "Sunday" game referenced in the media asset 105 may have taken place on Monday where the media asset is being viewed, for example, if a Sunday evening football game is being referenced but the media asset 105 is being accessed in portions of Asia where the game occurred on Monday morning local time. The media asset 105 may be accessed days, weeks, months, or even years thereafter, based on user interest or in some embodiments, by other computing systems seeking to identify information about past events. In such a case, the date-related reference 115 may not provide adequate information for the user to understand the actual date of the underlying event, even in the context of the remaining content 110. For example, a user may not recall the "rousing comeback" referenced by the content 110 and date-related reference 115, or may recall multiple rousing comebacks that may be referenced by the content 110 and date-related reference 115.

Figure 2:
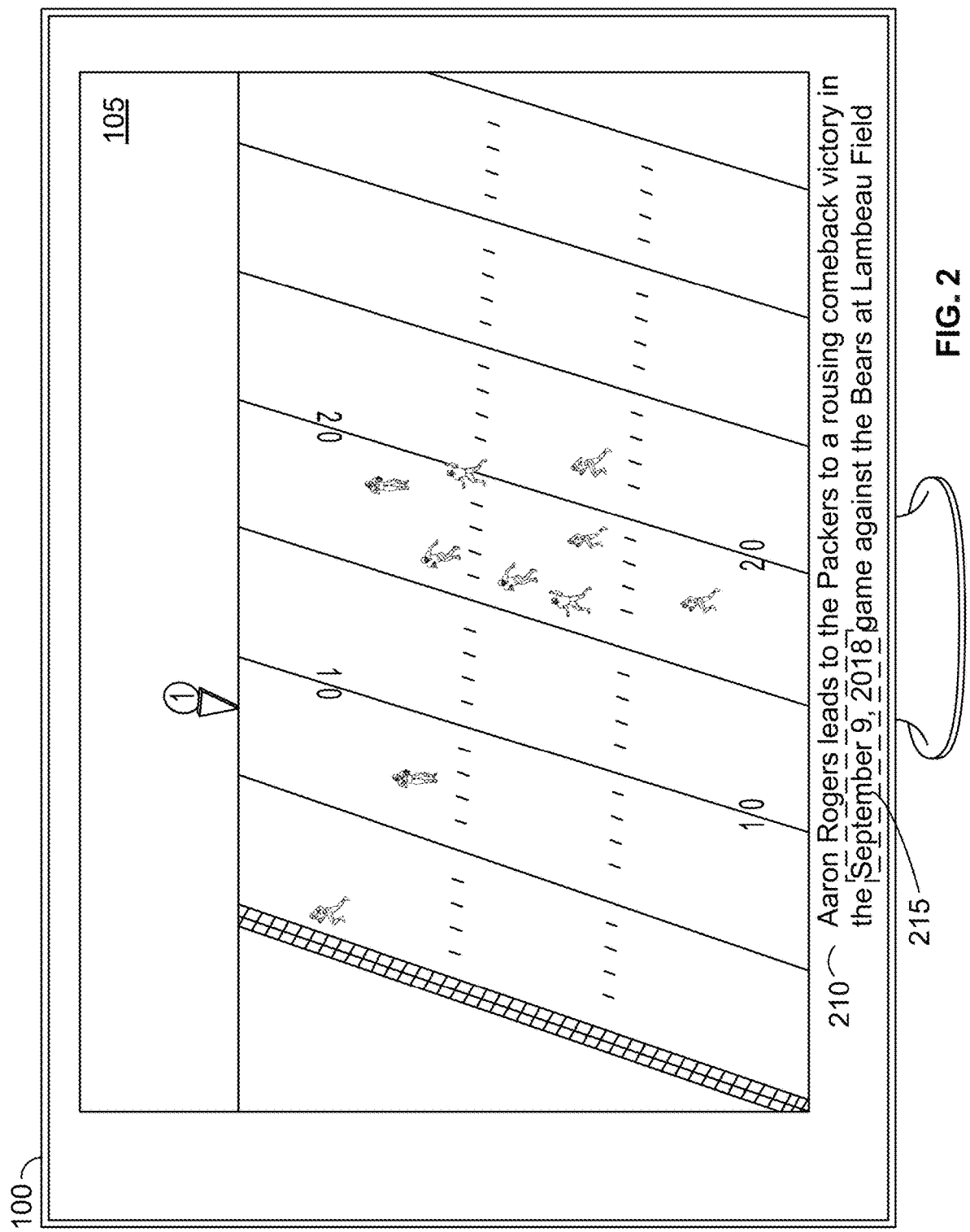
FIG. 2 shows an illustrative embodiment of a user interface depiction of a media asset including an absolute date replacing the date-related reference of FIG. 1, in accordance with some embodiments of the disclosure.

FIG. 2 shows an illustrative embodiment of a user interface of a media asset including an absolute date replacing the date-related reference 115 of FIG. 1, in accordance with some embodiments of the disclosure. In the exemplary embodiment of FIG. 2, the media asset 105 includes content 210 that has been modified to include an absolute date 215. As described herein, an absolute date 215 may be determined based on the original date-related information 115 and a context of a portion of the media asset 105 that includes the date-related reference.

Context for the portion of the media asset 105 may be determined from content of the media asset, metadata for the media asset, additional information external to the media asset, or a combination thereof. The content of the media asset may include information that can be used to identify the context, such as images that depict particular events or scenes. This content may be analyzed based on known events or scenes to generate the context. Additional content such as other text, closed captioning, or other related portions of the media asset may also be used to establish context. Metadata may be of multiple types as described herein, and can be used to directly determine an absolute date (e.g., the context may be the absolute date specified in metadata) or may provide contextual information used to establish an absolute date. Additional information external to the media asset may also be used to establish context. For example, information about the creator of the media asset, the distribution channels for the media asset, other viewers of the media asset, and information about other media assets may be used to establish context (e.g., by comparison to the portion of the media asset being analyzed) for the media asset. Based on the context and the date-related reference 115, the absolute date 215 may be determined, for example, by identifying an event that most likely corresponds to both the context and the date-related reference.

The absolute date 215 may be presented with the media asset 105, for example, by modifying the content of the underlying media asset, modifying metadata for the media asset, providing a separate data source (e.g., a separate file, data stream, remote link, etc.), or a suitable combination thereof as described herein. In the exemplary embodiment of FIG. 2, the content 210 may correspond to the original content 110 of FIG. 1, except that the date-related reference 115 of "Sunday" is replaced with the absolute date 215 of "Sep. 9, 2018." In embodiments in which other content of the media asset (e.g., audio, images, or closed captioning) include the date-related reference (not depicted in FIGS. 1-3), the other content may be replaced or modified, such as by providing a match of a voice providing the underlying audio content, modifying an image of the media asset to include the reference date in a similar manner of display of the original date-related reference, or changing closed caption text.

The absolute date 215 may be associated with a particular time base (e.g., a particular time zone where an event corresponding to the content occurred), or in some embodiments, may correspond to a standard time base such as Greenwich Mean Time ("GMT"). In some embodiments, an indication of the time base may be provided, such as by providing supplementary content indicating a time zone or location or modifying the presented content to include a location associated with the time base. Settings regarding the desired display of the absolute date display may be provided by the user, creator, distributer, equipment provider, or a suitable combination thereof. In this manner the display of the absolute date may be tailored for particular situations and use cases.

Figure 3:
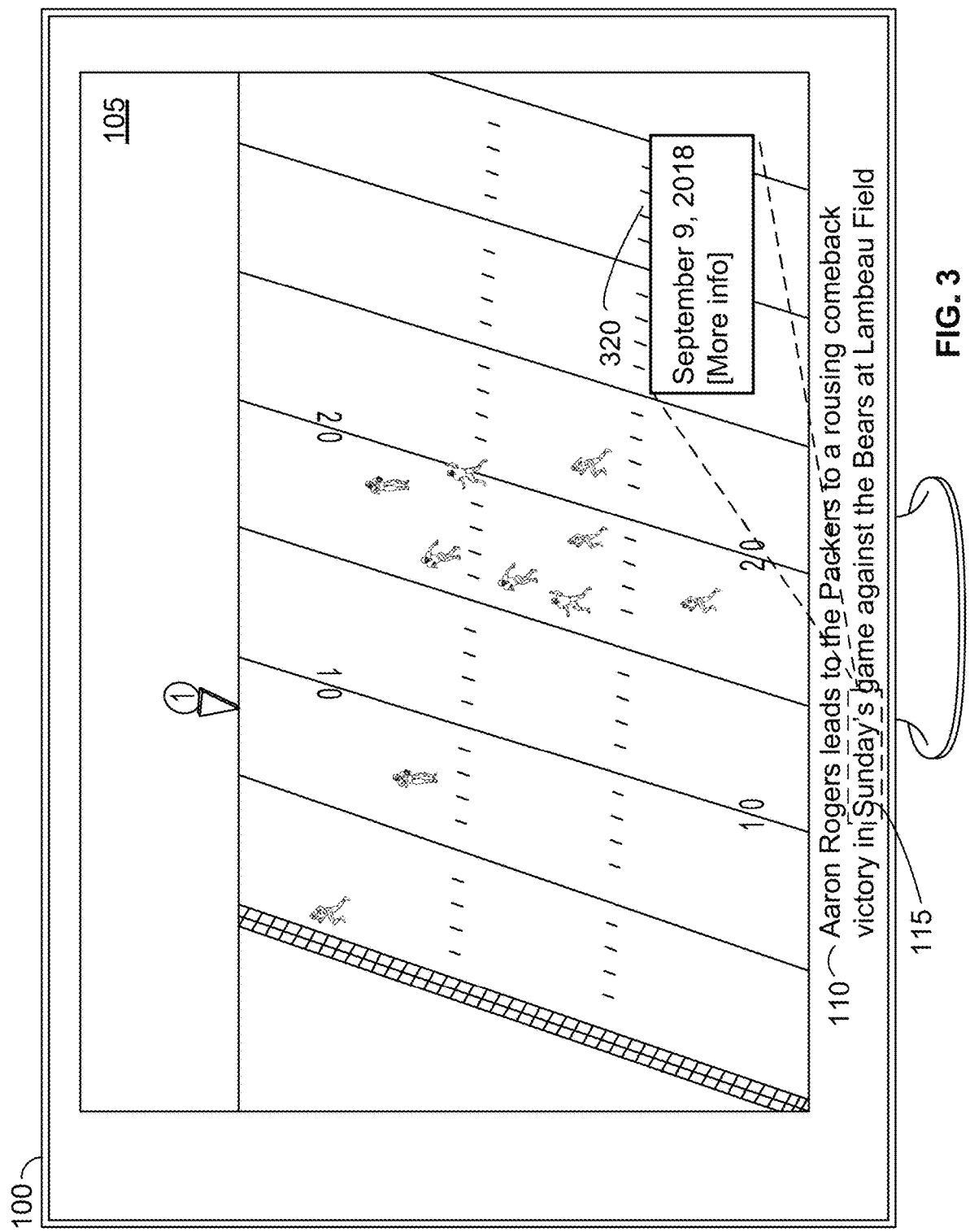
FIG. 3 shows an illustrative embodiment of the user interface depiction of a media asset including an absolute date and supplemental content augmenting the date-related reference of FIG. 1, in accordance with some embodiments of the disclosure.

FIG. 3 shows an illustrative embodiment of the user interface of a media asset including an absolute date and supplemental content augmenting the date-related reference of FIG. 1, in accordance with some embodiments of the disclosure. As is depicted in FIG. 3, the absolute date 320 is provided as supplemental content to augment the original content of the media asset (e.g., content 110, including date-related reference 115). Although not depicted in FIGS. 2-3, in some embodiments the original content may be modified (e.g., as depicted and described with respect to absolute date 215 of FIG. 2) concurrently with supplemental content is provided to the user (e.g., as depicted and described with respect to supplemental content 320 of FIG. 3).

The supplemental content 320 may be presented with the media asset 105 and content 110, for example, by modifying the content of the underlying media asset, modifying metadata for the media asset, providing a separate data source for the supplemental content (e.g., a separate file, data stream, remote link, etc.), or a suitable combination thereof as described herein. In the exemplary embodiment of FIG. 3, the supplemental content 320 includes the absolute date of "Sep. 8, 2018," which corresponds to the date-related reference 115. The absolute date may be associated with the media asset and displayed as described herein.

In some embodiments the supplemental content 320 may include additional information, as depicted by the "[More Info]" link of supplemental content 320. This additional information may provide links and other forms of information (e.g., embedded video content) related to the context for the date-related reference (e.g., an event associated with the date-related information) or to other events that are associated with the absolute date. The user may then access the additional content through the user interface. In some embodiments (not depicted in FIG. 3), the supplemental content may include multiple events or absolute dates that may be associated with the date-related reference. The user may be permitted to select among the multiple events or absolute dates, and in some embodiments, that selection may create an association between the date-related reference and the selection. In this manner, users may provide feedback and training data regarding associations between date-related references and events. This training data may be processed and aggregated in order to improve context determinations and selections of absolute dates from context determinations and date-related references.

Figure 4:
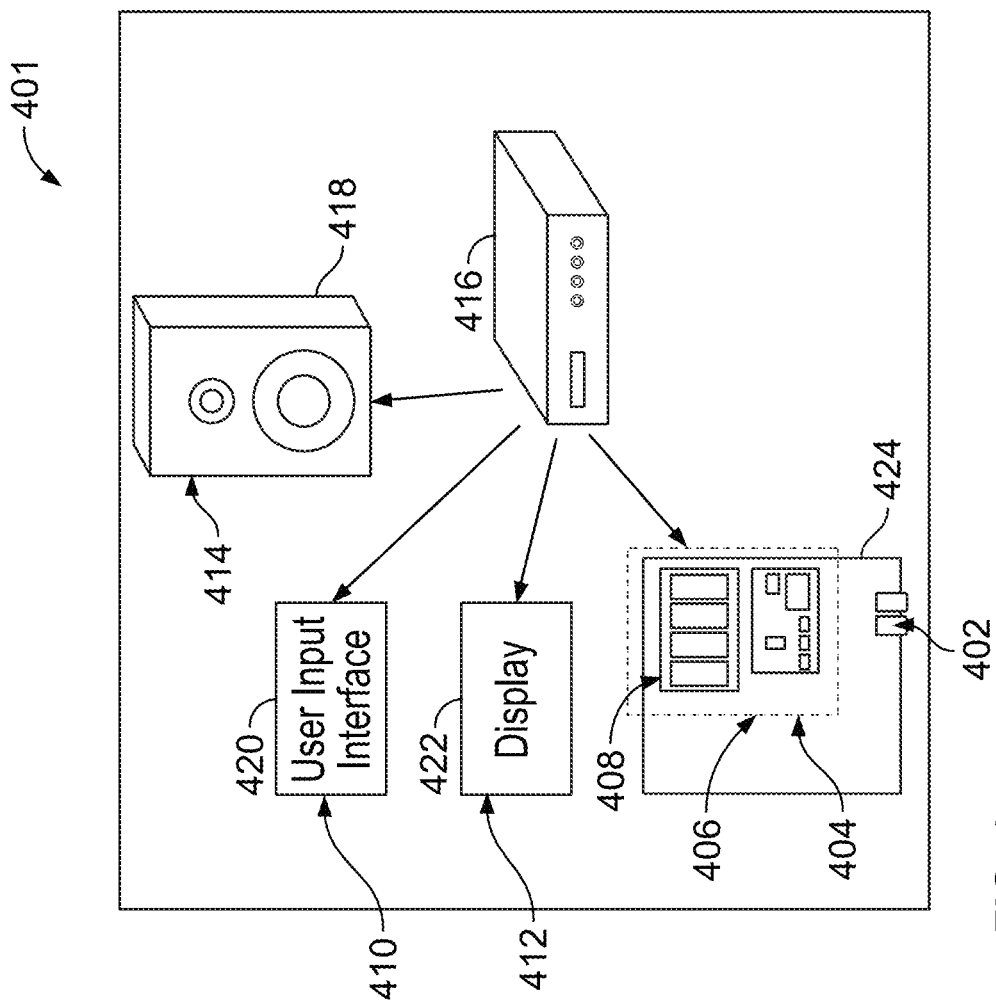
FIG. 4 is a block diagram of an illustrative user equipment (UE) device, in accordance with some embodiments of the disclosure.
Figure 4:
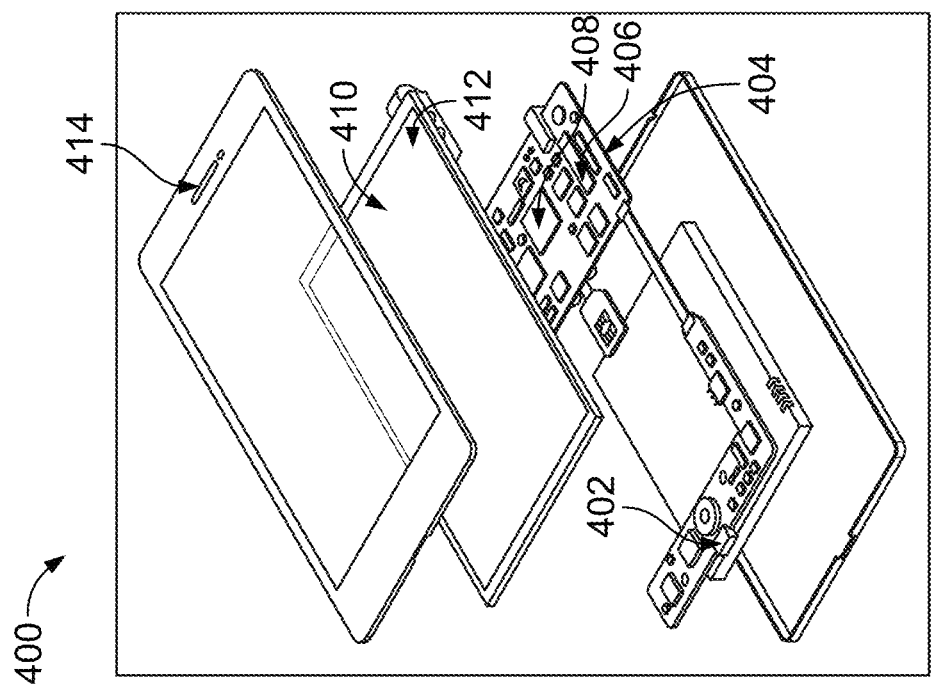
Figure 5:
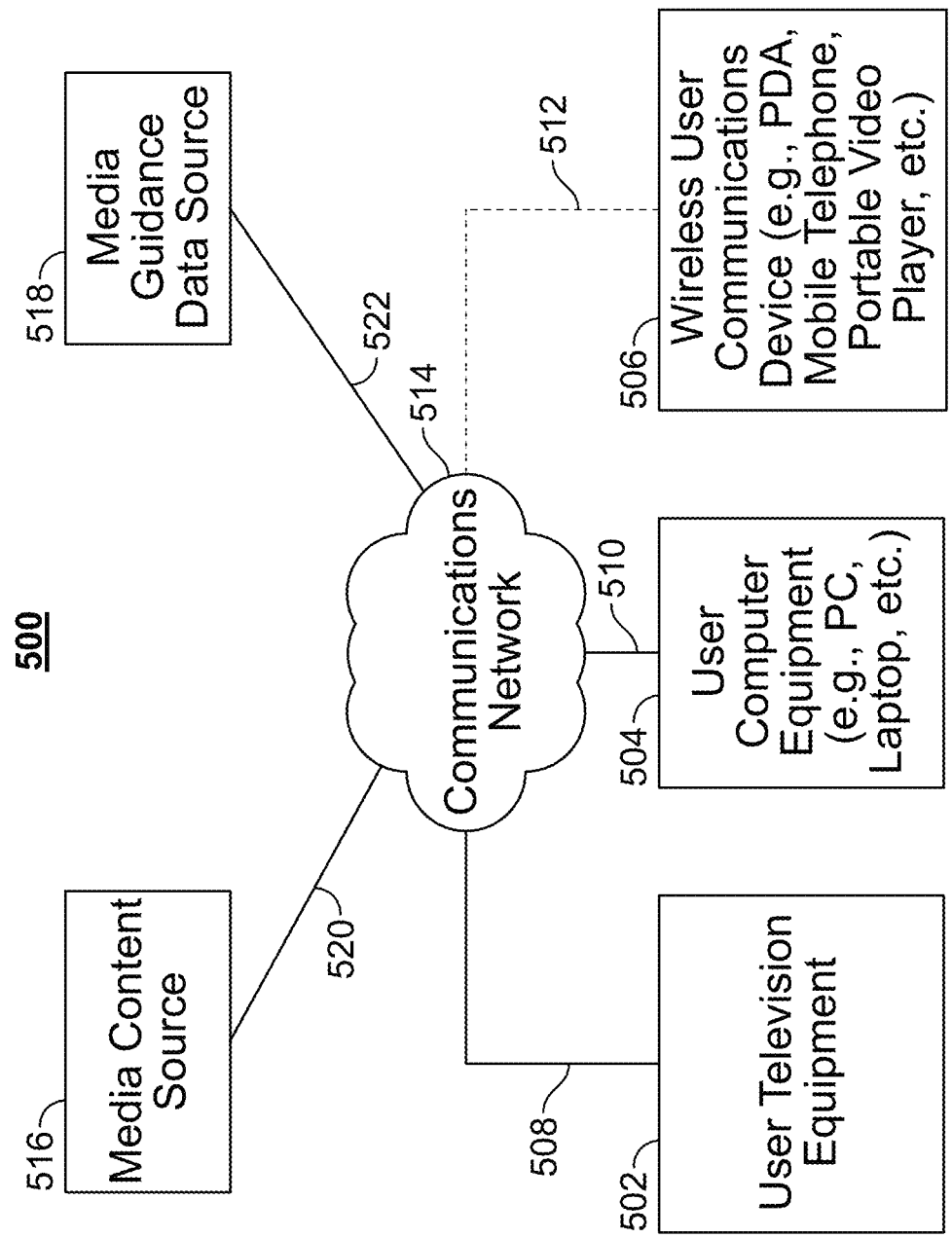
FIG. 5 is a block diagram of an illustrative media system, in accordance with some embodiments of the disclosure.

FIGS. 4-5 describe exemplary devices, systems, servers, and related hardware for creating, distributing, analyzing, and displaying media assets and content in accordance with the present disclosure. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, a user interface in accordance with the present disclosure may be available on these devices, as well. The user interface may be for content available only through a television, for content available only through one or more of other types of user equipment devices, or for content available both through a television and one or more of the other types of user equipment devices. The user interfaces described herein may be provided as on-line applications (i.e., provided on a web-site), or as stand-alone applications or clients on user equipment devices. Various devices and platforms that may implement the present disclosure are described in more detail below.

The devices and systems described herein may allow a user to provide user profile information or may automatically compile user profile information. An application may, for example, monitor the content the user accesses and/or other interactions the user may have with the system and media assets provided through the system. Additionally, the application may obtain all or part of other user profiles that are related to a particular user (e.g., from other web sites on the Internet the user accesses, such as www.Tivo.com, from other applications the user accesses, from other interactive applications the user accesses, from another user equipment device of the user, etc.), and/or obtain information about the user from other sources that the application may access. As a result, a user can be provided with a unified experience across the user's different user equipment devices. Additional personalized application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Users may access content and applications from one or more of their user equipment devices. FIG. 4 shows generalized embodiments of illustrative user equipment device 400 and illustrative user equipment system 401. For example, user equipment device 400 can be a smartphone device. In another example, user equipment system 401 can be a user television equipment system. In another example, user equipment system 401 may be in-vehicle entertainment system and/or vehicle control system. User equipment system 401 may comprise a set top box 416. Set top box 416 may be communicatively connected to speaker 418 and display 422. In some embodiments, display 422 may be a television display or a computer display. In some embodiments, set top box 416 may be communicatively connected to user interface input 420. In some embodiments, user interface input 420 may be a remote control device. Set top box 416 may include circuit board 424. In some embodiments, circuit board 424 may include processing circuitry, control circuitry, and storage (e.g., RAM, ROM, Hard Disk, Removable Disk, etc.). In some embodiments, circuit board 424 may include an input/output path. Additional implementations of user equipment devices are discussed below in connection with FIG. 5. Each one of user equipment device 400 and user equipment system 401 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (i.e., storage 408). Specifically, control circuitry 404 may be instructed by applications to perform the functions discussed above and below. For example, applications may provide instructions to control circuitry 404 to generate displays. In some implementations, any action performed by control circuitry 404 may be based on instructions received from the applications.

In client-server based embodiments, control circuitry 404 may include communications circuitry suitable for communicating with an application server or other networks or servers. The instructions for carrying out the above-mentioned functionality may be stored on the application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry.

Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of each one of user equipment device 400 and user equipment system 401. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from each one of user equipment device 400 and user equipment system 401, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of user equipment device 400 and user equipment system 401. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of each one of user equipment device 400 and user equipment system 401 or may be stand-alone units. The audio component of videos and other content displayed on display 412 may be played through speakers 414. In some embodiments, the audio may be distributed to a receiver (not shown), which processes and outputs the audio via speakers 414.

Applications may be implemented using any suitable architecture. For example, they may be stand-alone applications wholly-implemented on each one of user equipment device 400 and user equipment system 401. In such an approach, instructions of the applications are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the application is a client-server based application. Data for use by a thick or thin client implemented on each one of user equipment device 400 and user equipment system 401 is retrieved on-demand by issuing requests to a server remote to each one of the user equipment device 400 and the user equipment system 401. In one example of a client-server based application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on each one of equipment device 400 and equipment system 401. This way, the processing of the instructions is performed remotely by the server while the resulting displays are provided locally on each one of equipment device 400 and equipment system 401. Each one of equipment device 400 and equipment system 401 may receive inputs from the user via input interface 410 and transmit those inputs to the remote server for processing and generating the corresponding displays. For example, each one of equipment device 400 and equipment system 401 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to each one of equipment device 400 and equipment system 401 for presentation to the user.

In some embodiments, the application is downloaded and interpreted or otherwise run by an interpreter or virtual machine (run by control circuitry 404). In some embodiments, the application may be encoded in the ETV Binary Interchange Format (EBIF), received by control circuitry 404 as part of a suitable feed, and interpreted by a user agent running on control circuitry 404. For example, the application may be an EBIF application. In some embodiments, the application may be defined by a series of JAVA-based files that are received and run by a local virtual machine or other suitable middleware executed by control circuitry 404. In some of such embodiments (e.g., those employing MPEG-2 or other digital media encoding schemes), the application may be, for example, encoded and transmitted in an MPEG-2 object carousel with the MPEG audio and video packets of a program.

Each one of user equipment device 400 and user equipment system 401 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which an application may be implemented, may function as a stand-alone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. Applications may have the same layout on various different types of user equipment or may be tailored to the display capabilities of the user equipment. For example, on user computer equipment 504, applications may be provided as a web site accessed by a web browser. In another example, applications may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device. In some embodiments, absolute date and supplemental information for a date-related reference may be provided on a second screen device instead of or in addition to displaying such content on a first user equipment device.

The user may also set various settings to maintain consistent application settings across in-home devices and remote devices. Settings include those described herein, as well as channel and program favorites, programming preferences that the application utilizes to make programming recommendations, display preferences, and other desirable guidance settings such as settings related to display of absolute dates. For example, a user may maintain a variety of settings related to content that includes date-related references, such as selection of certain content (e.g., by type, provider, content, etc.) to be analyzed for date-related references and settings, reference sources for secondary information used to resolve absolute dates from date-related references, and preferences for the insertion and display of absolute date and supplemental information. Changes made on one user equipment device can change the guidance experience on another user equipment device, regardless of whether they are the same or a different type of user equipment device. In addition, the changes made may be based on settings input by a user, as well as user activity monitored by applications.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and data source 518 coupled to communications network 514 via communication paths 520 and 522, respectively. Paths 520 and 522 may include any of the communication paths described above in connection with paths 508, 510, and 512. Communications with the content source 516 and data source 518 may be exchanged over one or more communications paths, but are shown as a single path in FIG. 5 to avoid overcomplicating the drawing. In addition, there may be more than one of each of content source 516 and data source 518, but only one of each is shown in FIG. 5 to avoid overcomplicating the drawing. (The different types of each of these sources are discussed below.) If desired, content source 516 and data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Data source 518 may provide date-related data, such as the context data, absolute date data, and secondary source data described above. Date-related data may be provided to the user equipment devices using any suitable approach. In some embodiments, the date-related data may be received from and provided to the user equipment on a television channel sideband, using an in-band digital signal, using an out-of-band digital signal, or by any other suitable data transmission technique. Date-related data and other data may be provided to user equipment on multiple analog or digital television channels.

In some embodiments, date-related data from data source 518 may be provided to users' equipment using a client-server approach. For example, a user equipment device may pull data from a server, or a server may push data to a user equipment device. In some embodiments, an application client residing on the user's equipment may initiate sessions with data source 518 to obtain date-related data when needed, e.g., when media being accessed by a user includes a date-related reference or when a user provides selections that may be used as training data for determining absolute dates from date-related data. Communication between data source 518 and the user equipment may be provided with any suitable frequency (e.g., continuously, daily, a user-specified period of time, a system-specified period of time, in response to a request from user equipment, etc.).

In some embodiments, data received by the data source 518 may include viewer data that may be used as training data. For example, the viewer data may include current and/or historical user activity information related to portions of media assets that include date-related information. In some embodiments, the user activity information may include data from a second device, such as user inquiries attempting to identify an absolute date or event related to a date-related reference. The data may also include selections prompted by the application, such as selections of a particular event or absolute date from a plurality of candidate events or absolute dates presented to a user for a date-related reference.

Applications may be, for example, stand-alone applications implemented on user equipment devices. For example, the application may be implemented as software or a set of executable instructions which may be stored in storage 408, and executed by control circuitry 404 of each one of a user equipment device 400 and 401. In some embodiments, applications may be client-server applications where only a client application resides on the user equipment device, and server application resides on a remote server. For example, applications may be implemented partially as a client application on control circuitry 404 of each one of user equipment device 400 and user equipment system 401 and partially on a remote server as a server application (e.g., data source 518) running on control circuitry of the remote server. When executed by control circuitry of the remote server (such as data source 518), the application may instruct the control circuitry to generate the application displays and transmit the generated displays to the user equipment devices. The server application may instruct the control circuitry of the data source 518 to transmit data for storage on the user equipment. The client application may instruct control circuitry of the receiving user equipment to generate the application displays.

Content and/or data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOU-TUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide data described above. In addition to content and/or data, providers of OTT content can distribute applications (e.g., web-based applications or cloud-based applications), or the content can be displayed by applications stored on the user equipment device.

Figure 6:
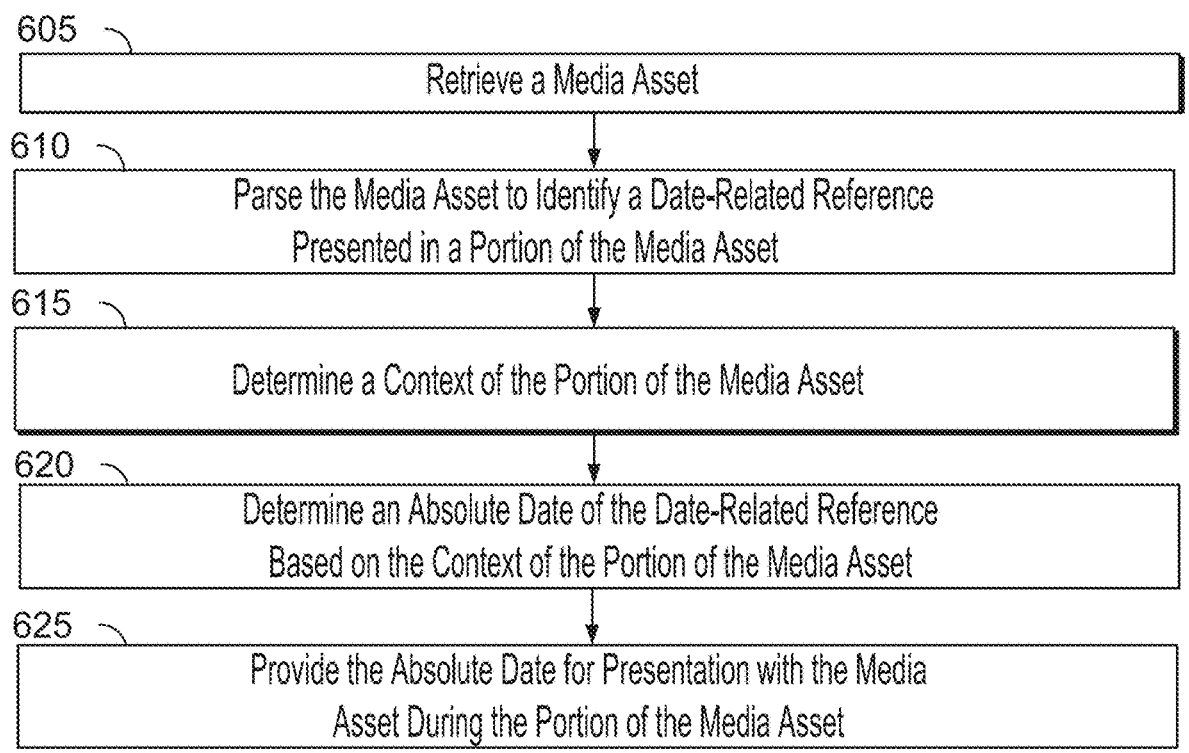
FIG. 6 is a flowchart of a process for providing an absolute date for a media asset including a date-related reference, in accordance with some embodiments of the disclosure.

FIG. 6 depicts an illustrative flowchart of a process for providing an absolute date for a media asset including a date-related reference, in accordance with some embodiments of the disclosure. The processes of FIGS. 6-9 may be executed by any of control circuitry (e.g., control circuitry 404) any computing equipment and devices described herein, such as different types of user equipment, content sources, and data sources as described herein. Although particular steps of these methods may be described herein as being performed by particular equipment or devices, it will be understood that the steps of the processes depicted and described in FIGS. 6-9 or aspects of those steps may be performed at different computing equipment and devices and data exchanged over communications networks as described herein.

At step 605, a media asset is requested, e.g., from a content source 516 by control circuitry 404 of user equipment. In an embodiment, a user may access a media guidance application that provides listings and access to broadcast and on-demand media assets. The user requests the media asset via the media guidance application which in turn retrieves the requested media asset via one or more communication networks. The media asset or portions thereof are retrieved and processed for display to the user on the user equipment. In an exemplary embodiment as depicted in FIGS. 1-3, the media asset may be a sports highlight show that includes video clips, an audio overlay, and descriptive text for various sporting events. As depicted in FIG. 1, example descriptive text for a depicted portion of the sports highlight show may include the descriptive text 110 of "Aaron Rogers leads the Packers to a rousing comeback victory in Sunday's game against the Bears at Lambeau Field."

At step 610, the media asset may be parsed to identify a date-related reference that is presented in a portion of the media asset. Parsing may be performed in real-time as a media asset is being broadcast or streamed, or in some embodiments, may be performed by one or more data processing entities, such as entities that broadcast or produce the content or third parties that analyze media assets. The parsing may be performed for one or more content types such as visible rendered text of a media asset, audio of a media asset, closed caption text, or video/images of a media asset. The parsing may be performed to identify discernable portions of the media asset that may include date-related information, such as words and phrases that provide ambiguous or relative date information or symbols that are indicative of a date (e.g., calendars or indications of a particular holiday or event). In addition to identifying the date-related information within the media asset, the parsing may also associate the date-related information with the portion of the media asset that includes the date-related information, such as a particular time stamp, scene, events, commercial content, or other similar information that delineates a portion of the media asset from other portions of the media asset. In the embodiment depicted in FIG. 1, the text 110 "Aaron Rogers leads the Packers to a rousing comeback victory in Sunday's game against the Bears at Lambeau Field" may be parsed into words to identify a date-related reference 115 such as "Sunday" or "Sunday's game."

In some embodiments, parsing may be performed based at least in part on a user input through a user interface. A user may identify a portion of the media asset (e.g., a portion of audio, text, or video) as including a date-related reference of interest to the user. Such selections may also be utilized by the system (e.g., by data source 518) as training data to identify patterns in data that are likely to include date-related information. In some embodiments, users may be incentivized to assist in parsing media assets to provide such training data.

At step 615, a context for the portion of the media asset may be determined. The context for the portion of the media asset may be determined from content of the media asset, metadata for the media asset, additional information external to the media asset, or a combination thereof. The content of the media asset may include information that can be used to identify the context, such as images that depict particular events or scenes. This content may be analyzed based on known events or scenes to generate the context, for example, based on known patterns that correspond to certain events. Additional content such as other text, closed captioning, or other related portions of the media asset may also be used to establish context.

Metadata can be used to directly determine an absolute date (e.g., the context may be the absolute date specified in metadata, or information that may be combined with the date-related reference to determine an absolute date) or may provide contextual information used to establish an absolute date. Examples of metadata include information about the creation, content, and distribution of the media asset, including date and time information, individuals and entities involved in or referenced in the media asset, categories and descriptions of subject matter, related subject matter and media assets, text or symbolic representations of audio and depicted text, and other information related to the media assets. Some or all of the metadata may be associated with particular portions of the media asset based on media asset information such as time stamps, scenes, events, commercial content, or other similar information that delineates a portion of the media asset from other portions of the media asset.

Additional information external to the media asset may also be used to establish context. For example, information about the creator of the media asset, the distribution channels for the media asset, other viewers of the media asset, and information about other media assets may be used to establish context (e.g., by comparison to the portion of the media asset being analyzed) for the media asset. Such information may be available from publicly available or commercial databases, from search engine queries, from social media networks, and other similar sources. For example, a content source 516 and data source 518 may each provide a source of additional information external to the media asset.

The context that may be determined from the content, metadata, or additional information is data or information that can be combined with a date-related reference to identify an absolute date. Non-limiting examples of a determined context include a known date, holidays, events, milestones, groupings of individuals or actors, combinations of events occurring within a particular time frame, combinations of identified individuals or actors with particular locations, and other suitable information from which a date or subset of possible dates may be ascertained. In the embodiment depicted in FIG. 1, context information that may be extracted from the content may include individuals (e.g., "Aaron Rogers"), locations (e.g., "Lambeau Field"), events (e.g., a game between the "Bears" and the "Packers"), and circumstances related to the event (e.g., a "rousing comeback"). Content may also be extracted from the images themselves, for example, based on a video signature associated with a well-known play in the sporting event. Examples of context information that may be extracted from the metadata may include the source of the video content that is being viewed (e.g., a sports television channel) and information about the video content (e.g., a date of recording or broadcast). Exemplary additional information from other sources may be tabulations of information and statistics that are relevant to the other context information from the content and metadata, such as compilations of sporting statistics available through search engines our resources such as data source 518.

At step 620, an absolute date for the date-related reference may be determined based on the context of the portion of the media asset. Context information such as known dates, holidays, events, milestones, groupings of individuals or actors, combinations of events occurring within a particular time frame, combinations of identified individuals or actors with particular locations, and other similar information may be processed to identify one or more absolute dates. In some embodiments, a plurality of candidate dates may be identified from the available context information. The absolute date that will be presented to the user from a plurality of candidate dates may be determined based on the date-related reference and a likelihood that the date-related reference is referring to a particular event. In some embodiments, analysis of additional information (e.g., from data source 518) or additional user interactions may be used to select between candidate dates. In an exemplary embodiment of user selection of candidate dates, such selections may be utilized as training data for machine learning systems to improve selection between candidate dates.

In the exemplary embodiment of FIGS. 1-3, examples of context information related to the portion of the media asset may include a date of a broadcast of the sports highlight program available from metadata of the media asset and additional information available regarding game scores available from a source such as data source 518. For example, the broadcast date for the sports highlight program may be on Wednesday, Sep. 12, 2018, the additional information may indicate that the Packers and Bears played on Sunday, Sep. 9, 2018, and the date-related reference of "Sunday" may be consistent with both the metadata and the additional information. Accordingly, Sunday, Sep. 9, 2018 may be selected as the absolute date associated with the date-related reference of Sunday in FIG. 1.

At step 625, the absolute date may be provided for presentation with the portion of the media asset that includes the date-related reference. As described and depicted herein, the date related reference may be replaced by the absolute date, the media asset may be augmented with the absolute date, and supplemental information may be provided with respect to the absolute date. The media asset may be modified, or in some embodiments, the absolute date and related information may be provided separately from the media asset and may augment the media asset. The presentation of the absolute date and supplemental information may include audio content, video content, images, closed captioning, or other suitable forms of presentation, including to additional devices such as a second source.

In the exemplary embodiment depicted in FIG. 2, the presentation of the media asset at step 625 may include modifying the original content 110 of the media asset to replace the original date-related reference 115 of "Sunday" to include modified content 210 in which "Sunday" is replaced with the absolute date 215 of "Sunday, Sep. 9, 2018." In the exemplary embodiment depicted in FIG. 3, the presentation of the media asset at 625 may include supplementing the original content 110 of the media asset such that the original date-related reference 115 of "Sunday" is still displayed but the absolute date 320 of "Sunday, Sep. 9, 2018" is displayed along with a "[More Info]" link for accessing additional content, as described herein.

Figure 7:
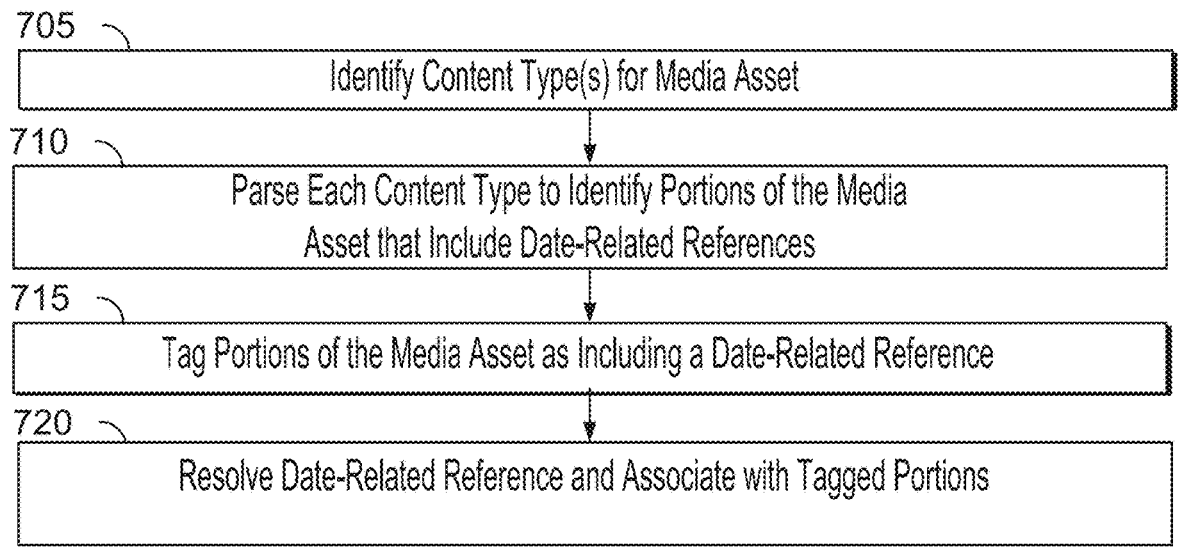
FIG. 7 is a flowchart of a process for identifying date-related references and related portions of a media asset, in accordance with some embodiments of the disclosure.

FIG. 7 is a flowchart of a process for identifying date-related references and related portions of a media asset, in accordance with some embodiments of the disclosure. Although the steps of FIG. 7 may be performed in the context of FIG. 6 (e.g., step 610), it will be understood that the steps of FIG. 7 may be performed independently and that identifying date-related references and portions of a media asset may be performed in other suitable manners, as described herein.

At step 705, content types of the media asset may be identified. For example, a media asset may include multiple different media types, such as audio, text, video, images, closed caption content, media streams, and a variety of combinations thereof. Different content may be provided in different media formats, while some forms of content may need to be separated from a common source (e.g., a data stream) for parsing. The identification may be performed locally by user equipment (e.g., upon receiving the media asset for presentation), remotely by a source such as a content source or data source (e.g., prior to providing the media asset to the user equipment), or a combination thereof.

At step 710, each identified content type from 705 may be parsed to identify portions of the media asset that include date-related references, as described herein. Speech recognition may be performed to identify language from an audio stream, text may be identified from video or images, and native text such as closed captioning may be captured for processing. Images and symbols such as clocks, calendars, and similar date-identifying content may also be processed. Parsing of each form of content may be performed by a variety of methodologies such as natural language and machine learning queries, in order to identify portions of the content (e.g., text, words, phrases, images, etc.) that include date-related references.

At step 715, the portions of the media asset that include the date-related reference may be tagged. Tagging may identify any suitable portion of the media asset, such as by time stamps, scenes, events depicted in the media asset, commercial content, or other similar information that delineates a portion of the media asset from other portions of the media asset. Tags may be associated with the media asset as a whole or may be associated with particular identified content. The tags may be added to the media asset (e.g., a data file or other media associated with the media asset) or may be provided as supplemental content available separately from the media asset.

At step 720, the date-related references and associated tagged portions may be resolved, e.g., to establish a finalized set of date-related references. Analysis of the media asset may identify multiple possible date-related references, and in some embodiments, date-related references from multiple types of content. In some embodiments, the identified date-related references and tags from a media asset may be further analyzed to optimize the date-related references. Multiple date-related references within a media asset may be identified as related and may be consolidated. For example, multiple references to days of the week may appear in proximity to references to an event or holiday. Date related references that are tagged for different content types from a common media asset may also be used to optimize the date-related reference, for example by correlating a day of the week from text content with a calendar from image content.

Figure 8:
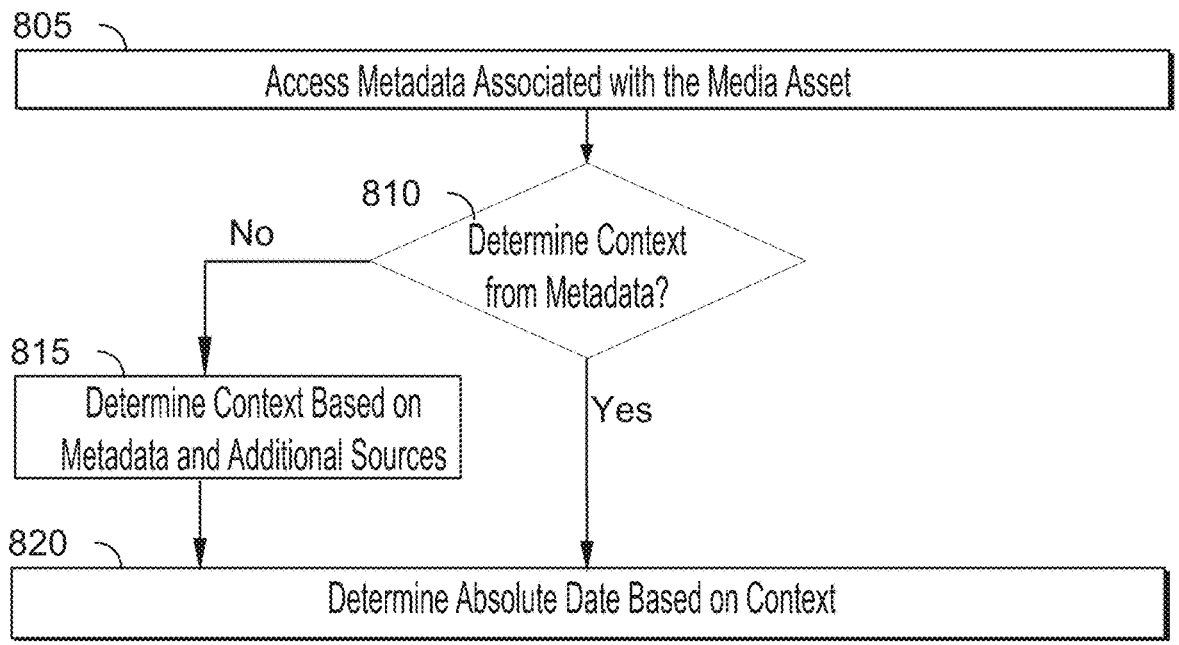
FIG. 8 is a flowchart of a process for identifying a context of a media asset, in accordance with some embodiments of the disclosure.

FIG. 8 is a flowchart of a process for identifying a context of a media asset, in accordance with some embodiments of the disclosure. Although the steps of FIG. 8 may be performed in the context of FIG. 6 (e.g., steps 615 and 620), it will be understood that the steps of FIG. 8 may be performed independently and that identifying date-related references and portions of a media asset may be performed in other suitable manners, as described herein. FIG. 8 depicts a process of determining a context for the date-related reference based on metadata for the media asset. However, it will be understood that the steps of FIG. 8 may be applied to other sources for determining context, such as based on the content of the media asset or other additional information. For example, in some embodiments (not depicted in FIG. 8) it may first be determined whether the context may be determined from the date-related reference alone or from content of the media asset, before considering metadata or other additional information to determine the context.

At step 805, metadata that is associated with the media asset is accessed. In some embodiments, certain metadata may be associated with particular portions of the media asset that include the date-related references. Other metadata may be determined to be related to the portions of the media asset that include date-related references, for example, based on indications of the metadata that categorize portions of the media asset. The relevant metadata may be compiled and associated with the appropriate date-related references (e.g., one or more date-related references that appear to refer to a particular unknown absolute date).

At step 810, it may be determined whether the context information may be determined from the metadata alone. A single metadata element may in some instances include adequate context information, such as by identifying a particular event (e.g., Game 1 of the NFL season between the Bears and Packers). In some embodiments, multiple metadata elements that are related to a single date-related reference may be combined to identify context for that date-related reference, such as metadata identifying a source of a broadcast signal (e.g., Green Bay, Wis.) and metadata identifying a type of program (e.g., a sports highlight program). If the context or a plurality of potential contexts may be determined with sufficient certainty from the metadata alone (e.g., based on a confidence level and threshold comparison), processing may continue to step 820, at which the absolute date is determined based on the context as described herein (e.g., based on the context and the date-related reference). If the context or a plurality of potential contexts cannot be determined with sufficient certainty from the metadata alone (e.g., based on a confidence level and threshold comparison), processing may continue to step 815.

At step 815, data from additional sources may be considered with the metadata to determine the context. In some embodiments, the content of the media asset may be analyzed, for example, by image recognition, facial recognition, voice recognition, or a variety of pattern-matching algorithms to identify context from the media asset such as events, individuals, scenes, locations and environments. For example, facial recognition may recognize a particular athlete (e.g., Aaron Rogers) or image matching may identify a particular location (e.g., Lambeau Field). Other sources may also be queried based on the metadata, media asset content, or both, to identify additional information related to the media asset and portions thereof. For example, commercial databases and search engines may be queried to acquire additional information that is relevant to the context. A context or plurality of potential contexts may then be determined based on the metadata and additional information, and processing may continue to step 820 to determine the absolute date based on the context as described herein (e.g., based on the context and the date-related reference).

Figure 9:
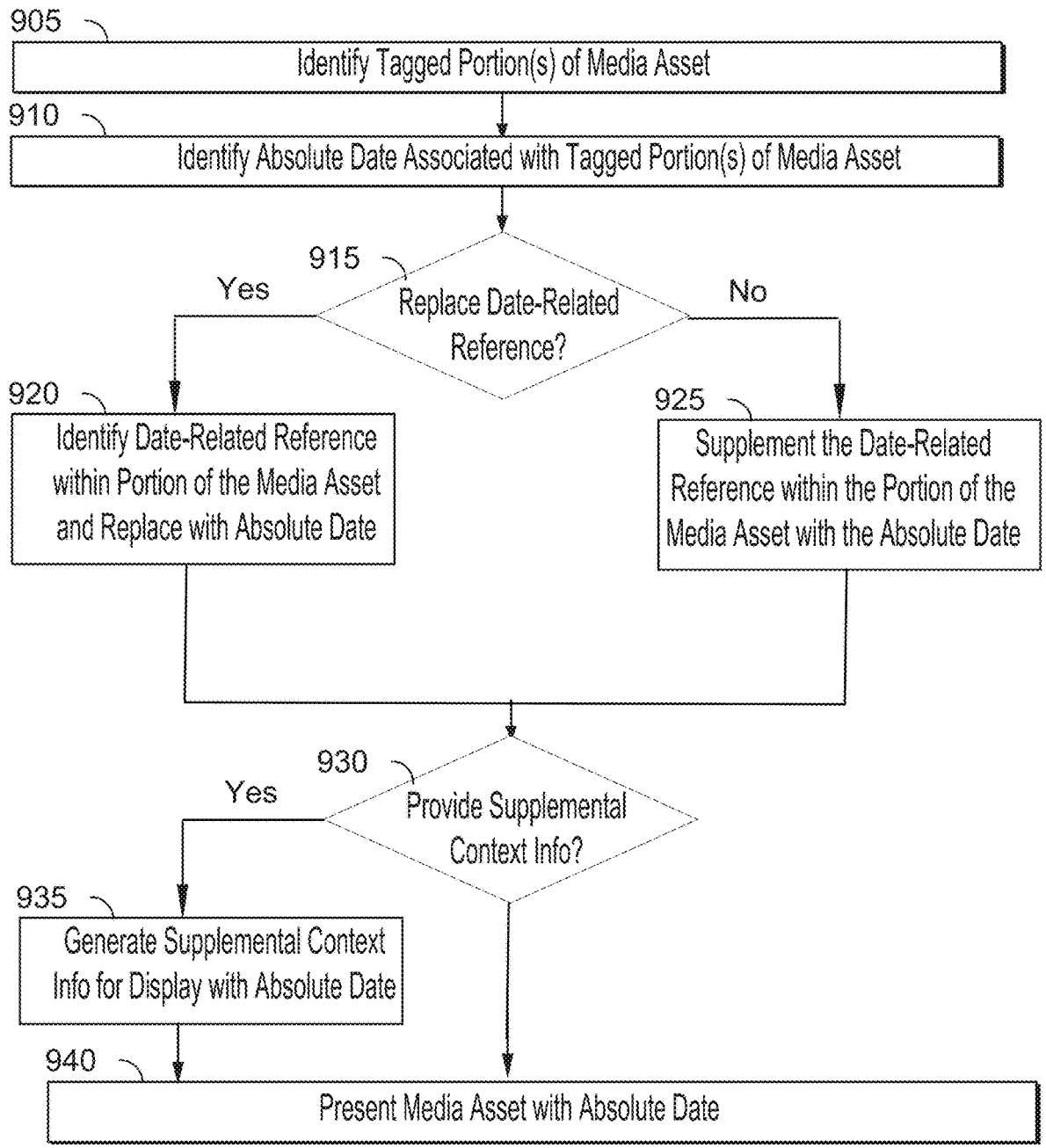
FIG. 9 is a flowchart of a process for presenting a media asset including an absolute date for a date-related reference, in accordance with some embodiments of the disclosure.

FIG. 9 is a flowchart of a process for presenting a media asset including an absolute date for a date-related reference, in accordance with some embodiments of the disclosure. Although the steps of FIG. 9 may be performed in the context of FIG. 6 (e.g., step 625), it will be understood that the steps of FIG. 9 may be performed independently and that identifying date-related references and portions of a media asset may be performed in other suitable manners, as described herein.

At step 905, tagged portions of the media asset may be identified based on tags that are provided as part of the media asset or as additional data provided with or accessible by the media asset. Tags may be provided at any suitable time during play of a media asset, and in some instances (e.g., a prerecorded media asset) may be provided prior to presentation of a date-related reference of a media asset. Media that is delivered in real-time or in temporal proximity to real-time may also include tags, e.g., to provide an indication that a date-related reference is being encountered within the media asset or is likely to be encountered in relatively short order.

At step 910, the absolute date information that is associated with the tag may be identified as described herein, for example, from the media asset (e.g., from an absolute date embedded into the media asset), from data provided with the media asset (e.g., a data structure including the tags and absolute dates), or from other sources (e.g., a data structure or data source separate from the media asset or tags). In embodiments in which a plurality of tags and absolute dates are associated with a media asset, the plurality of tags and absolute dates may be dynamically associated with each other.

At step 915 it may be determined whether to replace the date-related reference. As described herein, presentation of an absolute date associated with a date-related reference may be performed in a variety of different ways. Whether to replace the date-related reference may be decided based on whether the date-related reference is capable of replacement as well as settings related to the media asset, user, user equipment, content source, or data source. Certain types of content may be able to be replaced with relatively less processing time or bandwidth. For example, replacement of a date-related reference in closed-captioning may be simpler (e.g., replacement of characters) than replacement of audio or video content. In some embodiments, replacement may depend on user settings, equipment capabilities, or available communications channels for receiving content that may include a replacement for the date-related reference.

If the date-related reference is to be replaced, processing may continue to step 920 in which the date-related reference of the media asset is replaced with media content of the same type (e.g., text, audio, video, and other media as described herein) that includes the absolute date. If the date-related reference is not to be replaced, processing may continue to step 925 in which the original date-related reference may be retained within the media asset while the absolute date is provided as supplemental information within the media asset. In some embodiments the supplemental information may be provided as a different type of content than the original date-related reference (e.g., as a text overlay of an audio discussion of a date-related reference).

At step 930 it may be determined whether to provide supplemental context information in addition to the absolute date. As described herein, a variety of supplemental information relating to absolute date or context may be provided in multiple of suitable formats. Whether to provide the supplemental information with the absolute date be decided based on whether the supplemental information is capable of being provided with the media asset as well as settings related to the media asset, user, user equipment, content source, or data source. Certain types of supplemental information content may be provided with relatively less processing time or bandwidth. In some embodiments, supplemental content may be made available based on user settings, equipment capabilities, or available communications channels for receiving content with that may include a replacement for the date related reference. For example, the availability of supplemental information available from a remote server such as a content source 516 or data source 518 may be provided based on available bandwidth and user settings relating to network usage, among other factors. If supplemental context information is to be provided, processing may continue to step 935 at which the supplemental context information is generated to be provided to the user along with the absolute date, as describe herein. Processing may continue to step 940, at which the absolute date, and in some embodiments, supplemental context information, is provided to the user with the media asset, as described herein.

It is contemplated that the steps or descriptions of FIGS. 6-9 may be used with any other embodiment of this disclosure. In addition, the steps and descriptions described in relation to FIGS. 6-9 may be done in alternative orders or in parallel to further the purposes of this disclosure. Any of these steps may also be skipped or omitted from the process. Furthermore, it should be noted that any of the devices or equipment discussed in relation to FIGS. 4-5 could be used to perform one or more of the steps in FIGS. 6-9.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   causing the display of a media asset, wherein the display includes displaying a date-related reference; and
   determining, based on metadata of the media asset, whether to replace or augment the date-related reference;
   in real time during display of the media asset, replacing the display of the date-related reference with an absolute date in response to determining that the date-related reference is to be replaced; and
   in real time during display of the media asset, modifying the display of the media asset to display both the date-related reference and the absolute date in response to determining that the date-related reference is to be augmented.

2. The method of claim 1, wherein the determining whether to replace or augment the date-related reference comprises determining that the date-related reference is to be replaced when the date-related reference is displayed in a textual format.

3. The method of claim 1, wherein the determining whether to replace or augment the date-related reference comprises determining that the date-related reference is to be augmented when the date-related reference is displayed in an audio format.

4. The method of claim 1, wherein the determining whether to replace or augment the date-related reference comprises determining that the date-related reference is to be augmented when the date-related reference is displayed in a video format.

5. The method of claim 1, wherein the absolute date is obtained by:
   determining a context of a portion of the media asset based on metadata of the media asset; and
   determining the absolute date of the date-related reference based on the context of the metadata.

6. The method of claim 1, wherein, determining whether to replace or augment the date-related reference comprises:
   parsing the media asset to identify a date-related reference presented in a portion of the media asset; and
   determining the format of the parsed media asset to identify textual, audio, or video format.

7. The method of claim 6, wherein a textual format relates to a media asset having closed-captioning.

8. The method of claim 1, wherein modifying the display of the media asset to display both the date-related reference and the absolute date comprises displaying the absolute date as a textual overlay of the date-related reference.

9. The method of claim 1, wherein the absolute date is determined based on a context of a portion of the media asset, wherein determining the context comprises using a pattern-matching algorithm to identify context from the media asset.

10. The method of claim 1, wherein the absolute date is determined based on a context of a portion of the media asset, wherein determining the context comprises identifying a plurality of events that correspond to the description of the media asset.

11. A system, comprising:
    communication circuitry configured to access a media asset from a database; and
    control circuitry configured to:
    cause the display of the accessed media asset, wherein the display includes displaying a date-related reference; and
    determine, based on metadata of the media asset, whether to replace or augment the date-related reference;
    in real time during display of the media asset, replace the display of the date-related reference with an absolute date in response to determining that the date-related reference is to be replaced; and in real time during display of the media asset, modify the display of the media asset to display both the date-related reference and the absolute date in response to determining that the date-related reference is to be augmented.

12. The system of claim 11, wherein the determining whether to replace or augment the date-related reference comprises determining that the date-related reference is to be replaced when the date-related reference is displayed in a textual format.

13. The system of claim 11, wherein the determining whether to replace or augment the date-related reference comprises determining that the date-related reference is to be augmented when the date-related reference is displayed in an audio format.

14. The system of claim 11, wherein the determining whether to replace or augment the date-related reference comprises determining that the date-related reference is to be augmented when the date-related reference is displayed in a video format.

15. The system of claim 11, wherein the control circuitry obtains the absolute by:

determining a context of a portion of the media asset based on metadata of the media asset; and determining the absolute date of the date-related reference based on the context of the metadata.

16. The system of claim 11, wherein, determining whether to replace or augment the date-related reference comprises:

Parsing, by the control circuitry, the media asset to identify a date-related reference presented in a portion of the media asset; and determining, by the control circuitry, the format of the parsed media asset to identify textual, audio, or video format.

17. The system of claim 16, wherein a textual format relates to a media asset having closed-captioning.

18. The system of claim 11, wherein, the control circuitry modifying the display of the media asset to display both the date-related reference and the absolute date comprises displaying the absolute date as a textual overlay of the date-related reference.

19. The system of claim 11, wherein the control circuitry determines the absolute date based on a context of a portion of the media asset, wherein determining the context comprises using a pattern-matching algorithm to identify context from the media asset.

20. The system of claim 11, wherein the control circuitry determines the absolute date based on a context of a portion of the media asset, wherein determining the context comprises identifying a plurality of events that correspond to the description of the media asset.

* * * * *